US006311099B1

(12) United States Patent
Jasper et al.

(10) Patent No.: US 6,311,099 B1
(45) Date of Patent: Oct. 30, 2001

(54) APPARATUS FOR REGULATING WELDING PARAMETERS DURING LASER BEAM WELDING

(75) Inventors: Knut Jasper, Stuttgart; Sven Breitschwerdt, Waiblingen; Carlo Schmid, Leonberg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/172,600

(22) Filed: Oct. 15, 1998

(51) Int. Cl.$^7$ ............................................ G06F 19/00
(52) U.S. Cl. ................. 700/166; 219/121.6; 706/900; 706/904
(58) Field of Search .................. 700/166, 258, 700/195, 95; 219/121.83, 121.64; 706/900, 904

(56) References Cited

U.S. PATENT DOCUMENTS

| | | | |
|---|---|---|---|
| 4,866,242 | * | 9/1989 | Martyr .......................... 219/121.64 |
| 4,977,512 | * | 12/1990 | Nakagawa ........................... 700/195 |
| 4,992,643 | * | 2/1991 | Fuerschbach ......................... 43/17.5 |
| 5,247,155 | * | 9/1993 | Steen .............................. 219/121.83 |
| 5,517,420 | * | 5/1996 | Kinsman et al. ..................... 700/166 |
| 5,572,102 | * | 11/1996 | Goodfellow et al. .............. 318/568.13 |
| 5,659,479 | * | 8/1997 | Duley et al. ........................ 700/166 |
| 5,715,375 | * | 2/1998 | Ito et al. ............................ 700/258 |
| 5,772,814 | * | 6/1998 | Grewell ................................ 156/64 |
| 5,910,894 | * | 6/1999 | Pryor .................................... 700/95 |
| 5,917,726 | * | 6/1999 | Pryor .................................... 700/95 |

FOREIGN PATENT DOCUMENTS

| | | |
|---|---|---|
| 4106008C2 | 8/1992 | (DE) . |
| 4-127984 | 4/1992 | (JP) . |
| 7-284931 | 10/1995 | (JP) . |
| 10-506059 | 6/1998 | (JP) . |
| 10-244385 | 12/1998 | (JP) . |
| WO 96/09912 | 4/1996 | (WO) . |

OTHER PUBLICATIONS

"Analyse thermografischer Bilddaten zur On–Line–Überwachung von Laserstrahlschweissprozossen," Gunnar Brüggemann and Frank Heindörfer, Magdeburg, 1994.

"Thermografische Bilderzeugung und—verarbeitung beim Laserschweibss", B. Brüggemann, Otto–von Guericke–Universitat Magdeburg, Nov. 1995.

"Opto–electronisher Sensor für die Echtzeitbeobachtung beim Laserschweissen zur Nahtführung und adaptiven Prozessbeeinflussung . . . ", Jüptner, Hollerman, Jul. 25, 1990.

Copy of Japanese Office Action and English translation of same.

* cited by examiner

*Primary Examiner*—William Grant
*Assistant Examiner*—Ronald D Hartman, Jr.
(74) *Attorney, Agent, or Firm*—Crowell & Moring LLP (57) ABSTRACT

An apparatus for regulating welding parameters during laser beam welding includes a camera for detecting the geometry of a melt bath formed during the welding process. The camera is connected with an image-data-processing unit. The welding depth is regulated by the processing unit as a function of the detected melt bath length or melt bath area. The focus position of the laser beam is regulated as a function of the geometric similarity factor, which is calculated as the quotient of the melt bath area and the distance between the geometric centers of gravity of the laser beam keyhole and the melt bath area. Detection and regulation of gaps between the workpieces of height offset between the workpieces and/or lateral offset of the laser beam is also provided for.

27 Claims, 6 Drawing Sheets

APPARATUS FOR REGULATING WELDING PARAMETERS DURING LASER BEAM WELDING

BACKGROUND AND SUMMARY OF THE INVENTION

The present invention relates to an apparatus for regulation during laser beam welding.

For some years, lasers have been used in industrial production, particularly for welding, cutting, and surface treatment. In the automotive industry, for example, laser welding technology is increasingly gaining importance because of the high processing speeds which can be achieved, the low thermal stress on the workpiece, and the high degree of automation which is possible. Connected with the use of this technology is the need for quality assurance of the weld seam, which has been produced, on the basis of the possibility of monitoring (and regulating) the welding process.

From "Opto-elektronischer Sensor für die Echtzeitbeobachtung beim Laserschweißen zur Nahtfuhrung und adaptiven Prozessbeeinflussung" (Opto-electronic sensor for real-time observation during laser welding for seam guidance and adaptive process influence) by W. Jüptner and B. Hollermann, Laser und Optoelektronik (Lasers and opto-electronics), 1990, 56 ff., a video-optic sensor is known in which image-assessing electronics are used to determine characteristics of the melt bath, and which, for photographing the melt bath geometry, comprises a black-and-white CCD camera for photographing a melt bath of a laser welding process, which bath is additionally illuminated with an illumination laser. The images of a melt bath, which are obtained, show the disruptive influence of the glow of the plasma produced in the center of the welding process, which effect is to be suppressed using an intensively radiating infrared lamp. In order to be able to assess the melt bath geometry, the image obtained is highly filtered (by using a Laplace filter and/or a low-pass filter and/or a Sobel filter) and binarized, as well as Fourier-transformed, if necessary. In the image obtained in this way, the melt bath cannot be shown in its entirety, since because of the prior image processing, the bright region obtained reproduces only parts of the melt bath, but not the real melt bath geometry, so that an assessment of an individual image cannot result in a clear statement about the geometry of the melt bath edge. For this reason, the inclusion of ten or more photographs by means of successive superimpositions is required in the known system.

From "Thermografische Bilderzeugung und -verarbeitung beim Laserschweißen" (Thermographic image generation and processing during laser welding) by G. Brüggemann in: Bildhafte Darstellung und Auswertung der Ergebnisse der ZfP (Pictorial representation and assessment of the results of nondestructive testing), DGZfP—Deutsche Gesellschaft für zerstörungsfreie Prüfung (German Society for Nondestructive Testing), Stutensee, Nov. 27–28, 1995, a system for quality control during laser welding is known, which comprises a CCD camera with polarization filters and metal interference filters set in front of it for selective and partial attenuation, by means of which the welding process is photographed in near infrared region. Since the heat radiation is already darkened to such an extent after the selective filtering of the light radiating from the melt bath, that further global darkening would cause the information about the heat field to be false, only local image fragments of the laser plasma and its direct surroundings are partially attenuated (darkened) by means of a gray filter mounted directly on the camera chip. Since a quantitative temperature measurement is to be conducted with the known system, a temperature is assigned to each gray value of the CCD camera. Further assessment is based on a comparison with reference geometries.

Furthermore, from "Analyse thermographischer Bilddaten zur On-Line-Überwachung von Laserstrahlprozessen" (Analysis of thermographic image data for on-line monitoring of laser beam processes) by G. Brüggemann and F. Heindorfer in: Schweißen und Schneiden (Welding and cutting), 1994, 622–625, a system for monitoring welding processes is known, in which, by recording the temperature field which is emitted during the welding process, the melt bath, i.e. its geometrical dimensions permit conclusions to be drawn with regard to changes in laser output and/or feed velocity, splitting and offset problems, through-welding losses, or the like.

From U.S. Pat. No. 5,517,420, an apparatus for regulating welding parameters during laser beam welding is known, in which the geometry of an interaction zone formed during the welding process is photographed using a camera, particularly a CCD camera, the camera being connected with an image-processing unit. From the image taken with the camera, spatial information about the size of the interaction zone is obtained by determining the number of bright pixels exceeding a predetermined number, the interaction zone comprising the melt bath and the welding plasma superimposed on the melt bath. This information is processed using a so-called fuzzy logic control and serves as the basis for stable control of the welding speed.

Proceeding from this state of the art, the invention is based on the task of making available an apparatus for regulating welding parameters during laser beam welding, in which direct on-line regulation of the laser welding process, particularly the depth and the location of the welding seam, and therefore minimization of welding defects during a welding process, is made possible.

Pursuant to the invention, to accomplish this task, an apparatus for regulating welding parameters during laser beam welding is proposed for regulating welding parameters during laser beam welding, comprising a CCD camera for detecting the geometry of a melt bath formed during the welding process, and an image data processing unit, wherein the camera is operably connected with the image-data-processing unit such that the welding depth is regulated as a function of the melt bath length or melt bath area detected.

Accordingly, the welding depth of the laser beam is regulated as a function of the detected melt bath length or melt bath area. The parameter of melt bath length or melt bath area can be derived directly and easily from the image of the melt bath detected by the camera. Studies have shown that the welding depth of the laser beam in the workpiece to be welded is related linearly to the length or area of the melt bath, so that the detected parameter of melt bath length represents a direct measure of the welding depth. This relationship is utilized pursuant to the invention for regulating the welding depth during the welding process, so that complicated temperature value assignment and calculation of a temperature profile of the melt bath is no longer necessary.

Furthermore, objects of the invention are accomplished by an apparatus for regulating welding parameters during laser beam welding comprising a CCD camera for detecting the geometry of a melt bath formed during the welding process, and an image processing unit wherein the camera is operably connected with an image-data-processing unit such that the focus position of the laser beam is regulated as a function of a geometric similarity factor, which is calculated as the quotient of the melt bath area and the distance between the geometric centers of gravity of the laser beam keyhole and the melt bath area. Accordingly, the focus position of the laser beam is regulated as a function of a geometric similarity factor, without the need for any temperature value assignment or calculations. The geometric similarity factor represents an empirical value of the focus position and is calculated as the quotient of the melt bath area and the distance between the geometric centers of gravity of the laser beam keyhole and the melt bath area. The geometric similarity factor includes the thought that a change in the focus position from the zero position will result in a change in the melt bath geometry.

As a development of the invention, a gap offset and/or the seam location of the laser beam is regulated as a function of the detected geometry of the melt bath front. The occurrence of a gap, a height offset, or an offset of the seam location of the laser beam results in a change in the geometry of the melt bath front in each instance, which can be detected by the inventive apparatus. Pursuant to the invention, the possibility of direct detection and regulation of a gap offset (for example a height offset at the zero gap or the existence of a gap with a small width) and/or the seam location of the laser beam is made available therewith.

As a development of the invention, recognition of melt bath ejections takes place via detection of the melt bath length or melt bath area. Melt bath ejections, which occur as the result of welding defects, result in a sudden change in the melt bath geometry, which is detected pursuant to the invention as a collapse of the melt bath length or melt bath area, so that direct and immediate recognition of melt bath ejections, which cause weld defects, is made possible.

In an advantageous development of the invention, a gray value assignment of the pixels of the melt bath image detected by the camera takes place, advantageously, a two-stage binarization with two gray-value limits being involved. Compared with pure binarization (white and black), the detected image of the melt bath is divided by this method into three regions, namely a region for the so-called keyhole of the laser beam, a region for the actual melt bath, as well as a region, which reproduces the surroundings of the melt bath. This inventive procedure for image processing yields an easily reproducible representation of a melt bath with clearly defined contours, which can be used as the basis for further inventive assessment and regulation.

BRIEF DESCRIPTION OF THE DRAWINGS

FIG. 9b shows a plan view of the melt bath belonging to the welding process in FIG. 9a;

FIG. 10b shows a plan view of the melt bath belonging to the welding process in FIG. 10a.

DETAILED DESCRIPTION OF THE DRAWINGS

Figure 1:
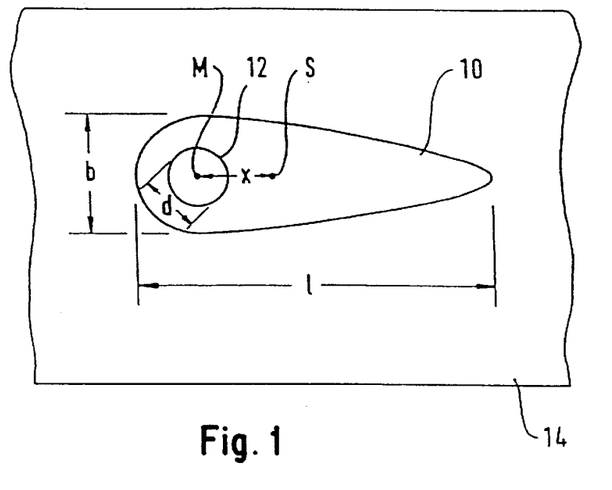
FIG. 1 shows a highly diagrammatic representation of a plan view of a melt bath, as it typically occurs during laser beam welding.

In a highly diagrammatic representation, FIG. 1 shows a plan view of a melt bath 10, as it typically occurs during laser beam welding. The melt bath 10 is located on a workpiece 14 which is being welded, and in the representation of FIG. 1 is being welded from right to left, the observation direction corresponding to the impact direction of the laser beam and welded seam 22, located on the right behind the melt bath, and the joint gap 24, located on the left ahead of melt bath 10 (see FIG. 2) not being shown in FIG. 1, in order to keep the representation as simple as possible.

The melt bath 10 essentially has the shape of an elongated drop, with a geometric center of gravity S. Length l and width b of melt bath 10 determine its geometry, by means of which inventive regulation of the welding parameters can be performed during laser beam welding, as will be explained below.

The impact point of the laser beam and the so-called keyhole 12, which surrounds it, are located at the broader, head end of melt bath 10, on the welding direction side (on the left in FIG. 1); this keyhole 12 is essentially circular with a diameter d and a geometric center of gravity (=center point) M. The distance between the geometric center of gravity M of keyhole 12 and the geometric center of gravity S of melt bath 10 is marked as x.

The form and shape of the melt bath geometry during laser beam welding, as explained, is determined by many factors, which interact in a complex manner. These factors can essentially be divided into three independent main groups: influences of laser parameters, machine parameters, and workpiece parameters.

As variables, which influence the melt bath geometry, the laser parameters are understood to be, in addition to the laser output itself, mainly the beam quality of the laser source and its behavior over time. Studying these characteristics is very important for a transfer of results obtained in experiments to laser sources, which have not been studied. The inventive apparatus is intended to achieve the result that the influence of the laser source on the processed measurement results can be eliminated mathematically. The influence of the focus position, the processing speed, and the process gas on the geometry of the melt bath and the keyhole was analyzed as central points of the machine parameters during the development of the inventive regulating apparatus. I welds and hollow welds, with and without a gap, as well as lateral offset of the laser beam to the joint plane, were investigated as workpiece parameters.

In order to be able to detect the geometry of melt bath 10 and of keyhole 12 with as little interference as possible, the inventive regulating apparatus had to be adapted to the requirements of laser welding. The melt of the melt bath emits electromagnetic radiation, predominantly in the infrared range, and can be easily detected in near infrared (NIR; 820 nm to 1050 nm). In this wavelength range, the metal plasma emits only very weak radiation and can therefore be filtered out using appropriate filters. Since processing speeds below a speed of 10 m/min are to be studied, an image repetition rate of 1/50 s is sufficient. Based on these general conditions, and with the premise of economic efficiency, a CCD chip for location resolved detection is best suited. Pursuant to the invention, this CCD chip is adapted with filters and shutters, so that contrast-rich representation of the melt bath, including the keyhole, can be achieved under normal room lighting and particularly without additional outside lighting. A sharp-edge interference filter and a gray filter of optical density 1 are used as filters.

Figure 2:
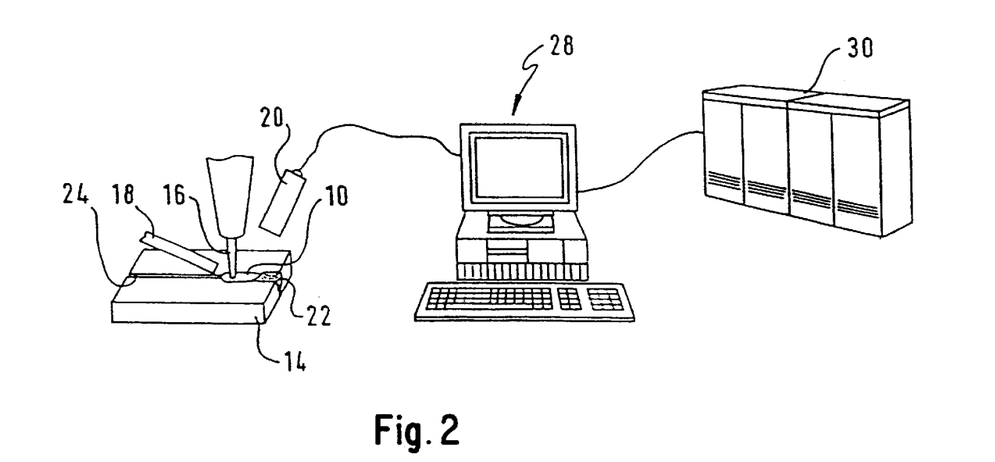
FIG. 2 is a schematic view which shows the structure of an embodiment of an inventive regulating apparatus.

FIG. 2 diagrammatically shows the arrangement of an embodiment of an inventive regulating apparatus. The inventive regulating apparatus comprises a CCD camera 20, which was equipped to detect the melt bath geometry as explained above. Camera 20 is aimed at a melt bath 10, which was created on a workpiece 14 by a laser beam welding process using laser beam 16. A plasma jet 18 is arranged at the head end of melt bath 10.

Camera 20 is connected to an image-data-processing unit 28, which essentially comprises an image-processing computer equipped with a monitor, which computer serves particularly for digitizing and binarizing- (gray value assignment) the image photographed by camera 20. Image-data-processing unit 28 is connected with a laser-and-machine control 30, which in turn is connected with the laser and the beam guidance machine (in a manner not shown). If necessary, a video recorder connected with camera 20 can additionally be provided as a control monitor.

Figure 8A:
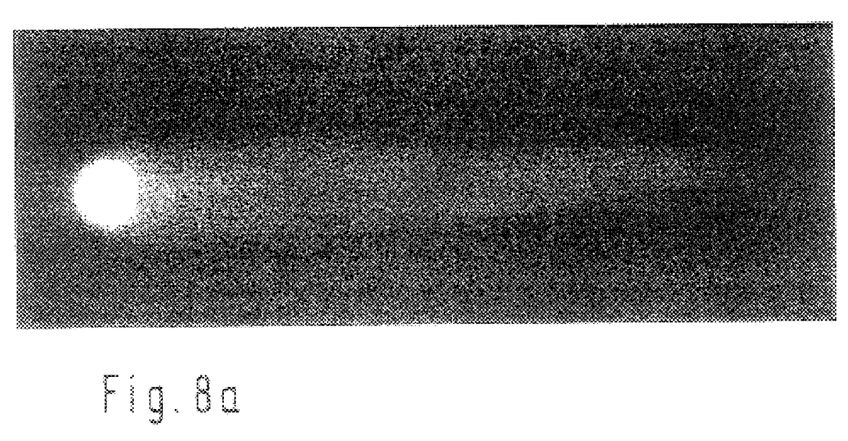
FIG. 8a shows an image of a melt bath taken with an inventive CCD camera.

FIG. 8a shows a photograph of a melt bath, which is aligned in accordance with the representation of FIG. 1 and was photographed using an arrangement shown in FIG. 2. The CCD camera used had a resolution of 752×582 pixels and the distance of the camera from the melt bath was 200 mm. The image was taken as a 50 Hertz PAL signal and a resolution of 200 $\mu$m was achieved. As described above, a filter system for a sharply defined infrared spectrum as well as a gray filter were placed ahead of the chip of the CCD camera, so that a contrast-rich exposure was obtained without additional outside lighting.

Figure 8B:
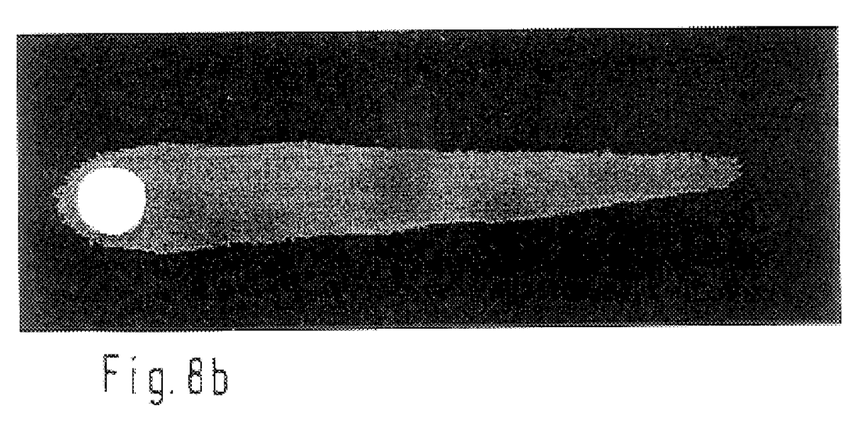
FIG. 8b shows the image of FIG. 8a after further electronic image processing.

FIG. 8b is a representation of the image shown in FIG. 8a after image data processing, in which the camera image underwent digitizing (0.4 MB/image), binarizing and data reduction (0.14 MB/image). A particular component of the image data processing is two-stage binarization to assign gray values, where white (for example >254 nm) is assigned to the brightest region, corresponding to the keyhole, a gray tone is assigned to the medium-bright region (for example >64), and black is assigned to the dark region (<64) corresponding to the workpiece. Because of the sharp presentation of contours, the result shown in FIG. 8b, of the processed camera image, permits problem-free detection of the geometry data of the melt bath and the keyhole, as was explained above with reference to FIG. 1.

Figure 3:
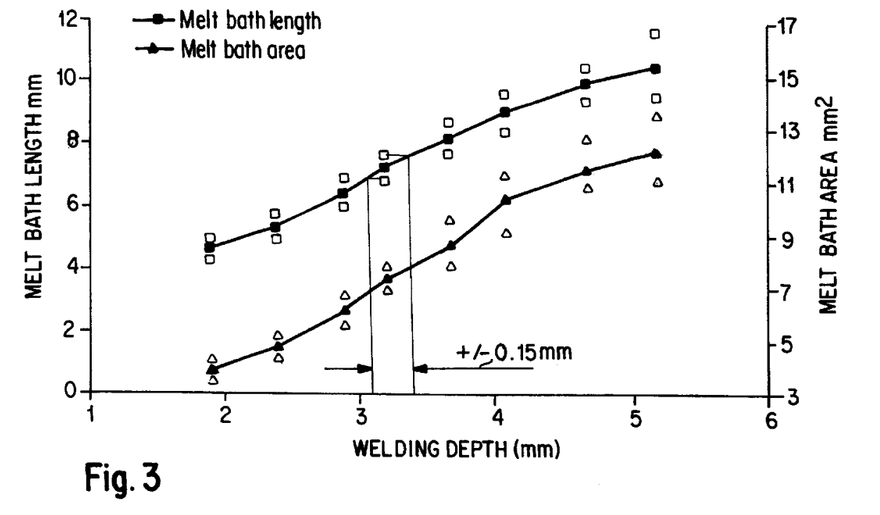
FIG. 3 shows a diagram illustrating the correlation between welding depth and melt bath length or melt bath area.

FIG. 3 shows a diagram illustrating the linear dependence of the melt bath length or melt bath area on the welding depth of the laser beam into the workpiece to be processed. In the diagram of FIG. 3, the melt bath length is plotted along the left ordinate axis in mm, and the melt bath area is plotted along the right ordinate axis in mm$^2$, above the welding depth in mm. The experimental values determined for the melt bath length are marked with solid squares, those for the melt bath area with solid triangles. The corresponding error limits are indicated with open squares and triangles, respectively. From the diagram of FIG. 3, it is evident that the welding depth can be determined precisely to ±0.15 mm, using an inventive apparatus.

Figure 4:
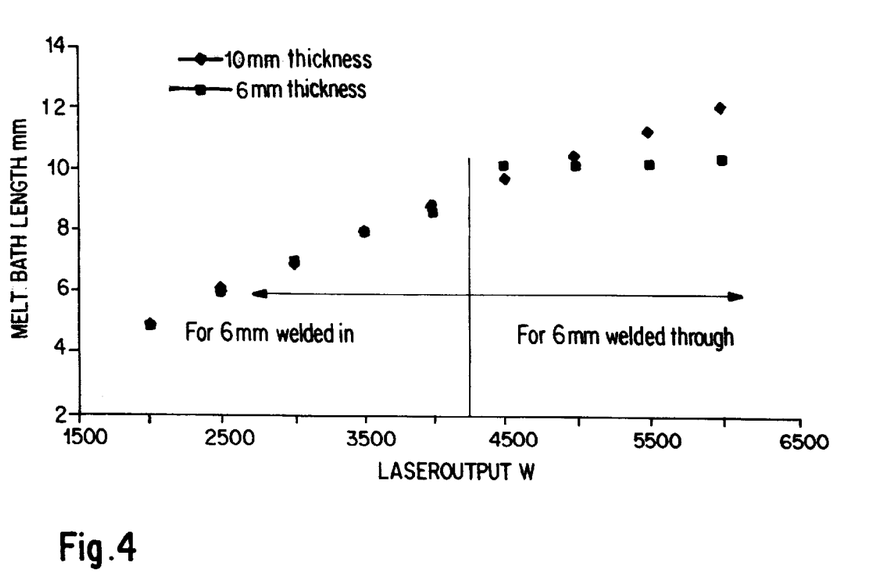
FIG. 4 shows a diagram illustrating the melt bath length as a function of the laser output supplied, for detecting a weld through the workpiece.

The linear dependence found to exist between the melt bath length and area, and the welding depth, can also be utilized, pursuant to the invention, for recognizing when a weld has gone through the workpiece, since the laser output supplied is proportional to the welding depth, but no further welding depth can, of course, be achieved if the weld has gone through, no matter how much the laser output is increased, so that the melt bath length no longer increases. This situation is reproduced in the diagram of FIG. 4, in which the melt bath length in mm is plotted above the laser output in watts. Here, two different sheet metals with a thickness of 6 mm (square measurement points) and a thickness of 10 mm (diamond-shaped measurement points) were subjected to laser welding treatment. Up to a thickness of 6 mm, an almost identical increase of the melt bath length above the laser output supplied was found. At a welding depth of 6 mm (in the example shown, corresponding to a laser output of approximately 3.8 kW), however, the thinner sheet metal had been welded through, so that even when the laser output increased, no further increase in the melt bath length could be recorded. For the thicker sheet metal, on the other hand, the melt bath length continues to increase linearly, even when laser output is increased further.

Accordingly, if it is found when the laser output is increased, that the melt bath length remains constant, it can be concluded that the workpiece has already been welded through. This fact is utilized in an inventive apparatus for on-line regulation of the laser output, so that defective welding due to too low a connection cross-section (e.g. line contact in the case of hollow welds) can be detected and minimized.

Figure 5:
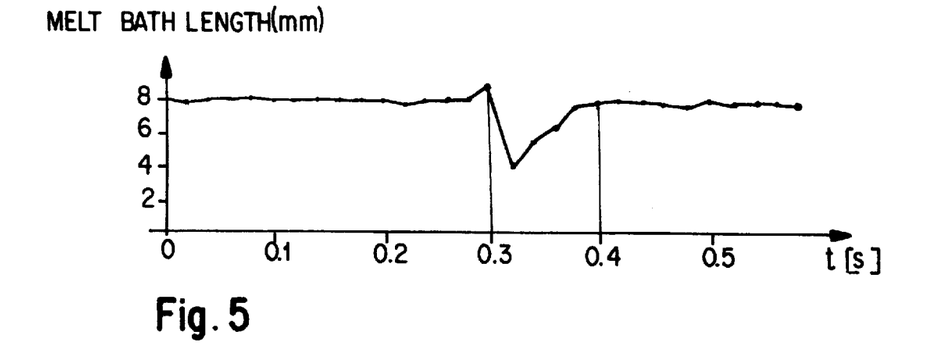
FIG. 5 shows a diagram of the melt bath length over time, for detecting melt bath ejections.

The linear relationship found to exist between the melt bath length, on the one hand, and the welding depth/laser output, on the other, can also be used to monitor the melt bath quality with regard to melt bath ejections. Pursuant to the invention, as shown in FIG. 5, the melt bath length is observed over time. In an ideal case, it should be constant if the laser output and welding depth remain the same. An abrupt change, such as that which takes place in the diagram of FIG. 5, in the region between 0.3 and 0.4 seconds, indicates a welding defect connected with a melt bath ejection, which results in a collapse of the melt bath length. The inventive apparatus therefore permits direct detection of such welding defects.

Figure 6:
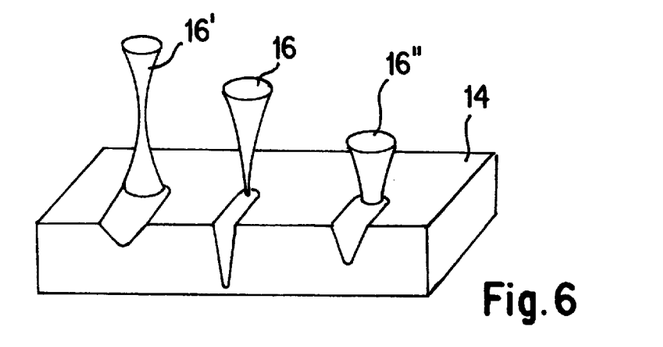
FIG. 6 shows a perspective view for illustrating the focus position during laser beam welding.

Another welding parameter, which influences the quality of the weld seam, is the focus position of the laser beam on the workpiece surface. FIG. 6 shows a workpiece 14, which is being processed with three different laser beams 16, 16', 16", where the center laser beam 16 lies at the focus zero position, that is, the focus position of the focus of the laser beam lies exactly on the surface of workpiece 14. The left laser beam 16' in FIG. 6 is in a positive focus position, that is, the focus is above the workpiece surface, which results in broadening of the laser beam at the workpiece surface and therefore an increase in the diameter d of the keyhole, as well as an increase in the width b of the melt bath and a reduction in the welding depth. Analogously, defocusing is defined as a negative focus position, where the focus of the laser beam lies inside workpiece 14, as is the case in the representation of FIG. 6, with laser beam 16" shown on the right.

In the development of the inventive regulating apparatus, it was now found that independently of the laser output and therefore of the melt bath area, the melt bath geometry has the same proportions when the focus is in the ideal position. Pursuant to the invention, this is described by the geometric similarity factor, which is calculated as the quotient of the melt bath area and the distance x between the keyhole center of gravity M and the melt bath center of gravity S.

Figure 7:
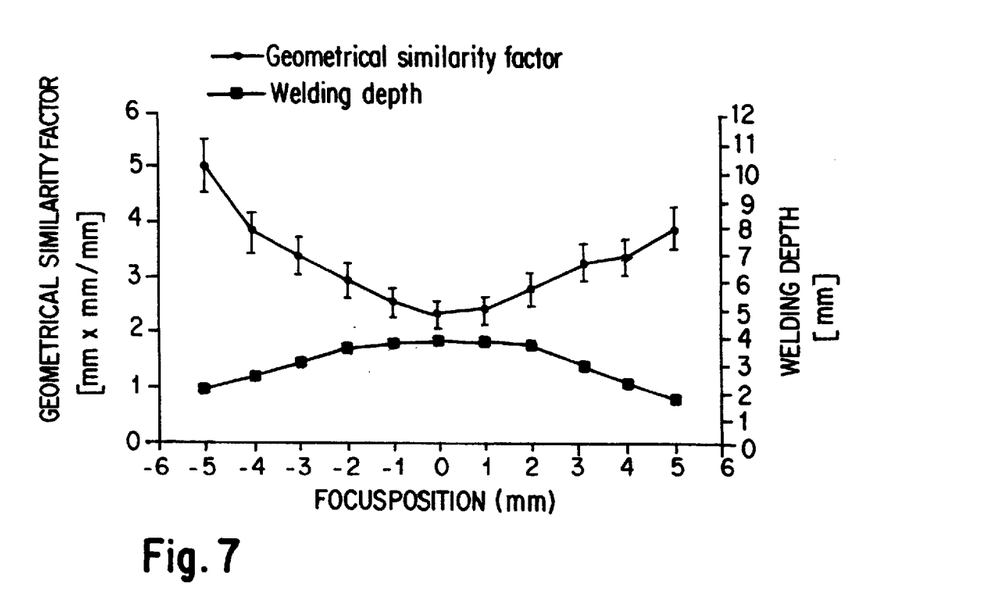
FIG. 7 shows a diagram of the inventive geometric similarity factor and the welding depth as a function of the focus position.

In the diagram of FIG. 7, the geometric similarity factor is plotted along the left ordinate axis above the focus position, while the welding depth is plotted along the right ordinate axis. The ideal focus position is 0 mm, in accordance with the above explanations, where, of course, the welding depth has its maximum and the curve of the geometric similarity factor has its minimum. With increasing defocusing into the positive or negative focus position, the welding depth decreases, and the geometric similarity factor increases (decrease in the distance between the centers of gravity of the keyhole and the melt bath). In the inventive regulating apparatus, regulation of the focus position of the laser beam therefore takes place as a function of the geometric similarity factor, always a minimum of this similarity factor. This permits constant subsequent regulation within a small region around the minimum of the similarity factor, and therefore around a maximum of the welding depth, which in turn leads to the best possible weld seam, namely a narrow and deep one.

Figure 9A:
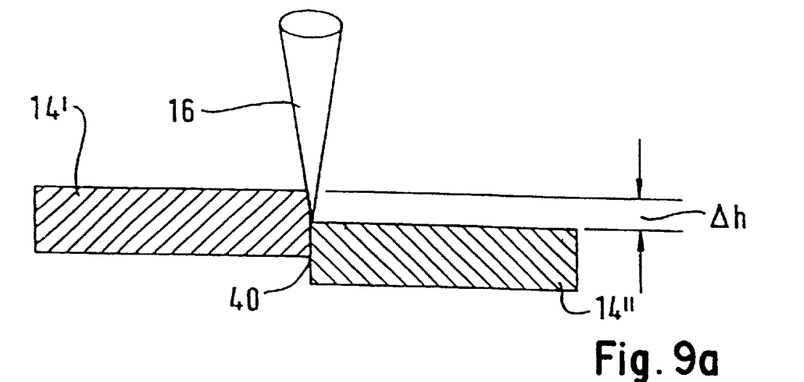
FIG. 9a shows a diagrammatic side view of a laser beam welding process, with workpieces offset relative to one another in height.
Figure 9B:
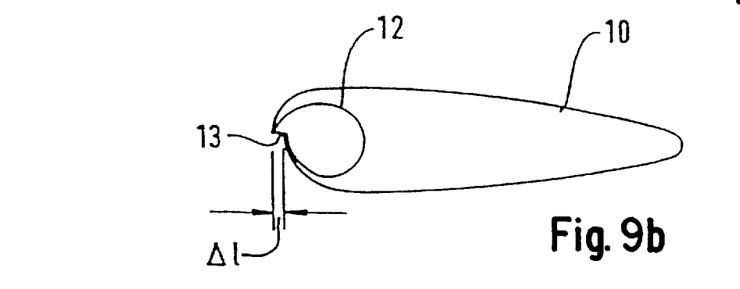

FIG. 9a shows a diagrammatic side view of a laser beam welding process, with a laser beam 16 directed at two workpieces 14', 14", joined together with a zero gap 40, the two workpieces 14', 14" demonstrating a height offset $\Delta h$ relative to one another. Such a height offset of the edges at joints can either be intentional or occur as a defect. With the inventive apparatus for regulating welding parameters, the height offset $\Delta h$ can be detected as a change in the geometry of the melt bath front. A melt bath 10, which belongs to such a height offset, is shown in FIG. 9b.

When a height offset $\Delta h$ occurs between the workpieces to be welded together, a projection 13 is formed at the melt bath front due to an asymmetric deformation. In other words, a length offset occurs at the melt bath, so that the left half of the melt bath has a length different from that of the right half of the melt bath. In the example shown in FIG. 9b, the left half of melt bath 10 is therefore shorter than the right half, causing the projection 13 to be formed, as described. The length difference, that is, the length of the projection, is $\Delta l$ in this instance, which is a measure of the height offset $\Delta h$.

The ability to detect this projection can be influenced by the position of the camera. For one thing, the local resolution of the system can be improved clearly by reducing the distance between the camera and the workpiece surface. On the other hand, the angle relative to the vertical, at which the camera is affixed, results in a distortion of the image in the length direction of the melt bath. The greater the angle of inclination of the camera relative to the vertical, the greater are the changes in the length direction of the melt bath, and therefore the projection, which occurs in the melt bath front, will also be evident. A camera position must therefore be selected, which represents a compromise between the sharpness of the image, that is, detection of the entire melt bath area, and the ability to detect the change in the melt bath front.

If a height offset during welding is desired, the information obtained from the deformation of the melt bath front can be used by the inventive regulating apparatus to control the weld, by maintaining the geometry of the projection 13. If, on the other hand, a height offset is not wanted, the workpiece guidance can be regulated in such a way, that the melt bath front assumes an as ideal shape as possible (see FIG. 1).

Figure 10A:
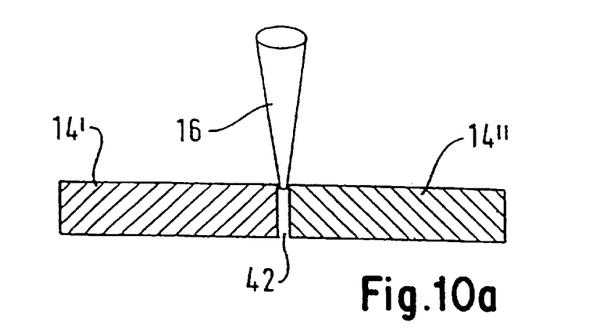
FIG. 10a shows a diagrammatic side view of a laser beam welding process, with a gap between the workpieces to be welded.
Figure 10B:
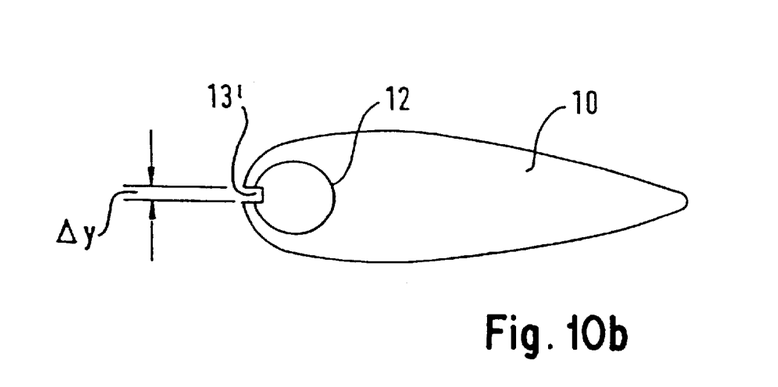
Figure 11:
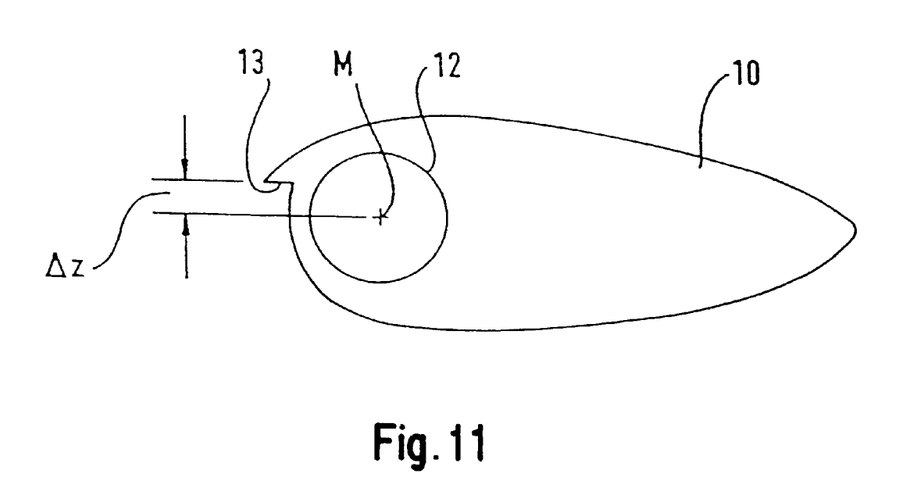
FIG. 11 shows a diagrammatic plan view of a melt bath, with lateral offset of the laser welding beam.

In FIGS. 10a and 10b, the influence of a gap on the melt bath geometry is shown. FIG. 10a shows a diagrammatic side view of two workpieces 14', 14" to be welded using a laser beam 16, which are not joined directly to one another, but rather have a gap 42 between them. Such a gap has an effect on the geometry of the melt bath front, as is evident from FIG. 10b, in that the front essentially has a rectangular indentation 13', the width $\Delta y$ of which is a measure of the gap width between the two workpieces 14', 14".

The so-called technical zero gap (reference symbol 40 in FIG. 9a), as well as small gap widths of the order of approximately 0.05 mm, cannot be seen in the melt bath front. Starting from a width of about 0.1 mm, the workpiece edges, which form the boundary of the gap, are marked clearly in the melt bath front, so that starting from this gap width, the change in the melt bath front can be used to determine the gap width and to determine the weld position in an inventive manner.

In addition to the actual gap width, the camera position again has a decisive effect on the ability to detect the gap. By decreasing the distance between the workpiece surface and the camera, a clear improvement in the local resolution of the system is obtained. The best results therefore were achieved with the minimum camera distance that can be implemented, approximately 100 mm. However, since the entire melt bath area can no longer be detected at higher output with this image segment, a compromise between the desired image resolution and the necessary image segment must be selected.

As mentioned above, a technical zero gap cannot be detected without special preparation of the weld. With the inventive apparatus, there is the possibility, by producing a bevel on one of the two workpieces, of detecting such a zero gap, since a bevel has the same effect on the melt bath geometry as does a slight height offset and, accordingly, results in a change in the melt bath front, as in FIG. 9b.

In the examples described with reference to FIGS. 9a, 9b, 10a, and 10b, the position of the detectable edges depends on the position of the laser beam relative to the joint position between workpieces 14', 14". If the beam is positioned correctly, the detectable edges of projection 13 or indentation 13' are located in the center of the melt bath front. If either the laser beam or the workpiece changes position, the detectable edges migrate laterally out of the melt bath front. This results in an offset by $\Delta z$ of the edge in question, relative to the center of gravity M of the keyhole. This lateral offset of the laser beam can be controlled by the inventive regulating apparatus, in such a way that the offset $\Delta z$ becomes equal to zero.

Pursuant to the invention, an apparatus for regulating welding parameters during laser beam welding is therefore made available and serves as the basis for on-line quality assurance, monitoring the depth and the location of the weld seam, and therefore for an on-line control circuit. Pursuant to the invention, regulating takes place by way of primary parameters of the welding process, particularly the welding depth and the focus position. Monitoring of these parameters is derived directly from the melt bath geometry, which is derived, by means of an inventive camera and an image data-processing unit, directly from a high contrast, processed image of the melt bath to be monitored and regulated. The image-data-processing unit can be a computer with normal processing and memory capacity, for example a personal computer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for regulating welding parameters during laser beam welding, comprising:
   a CCD camera for detecting a geometry of a melt bath formed during a welding process, and
   an image data processing unit,
   wherein the camera is operably connected with the image-data-processing unit such that a welding depth is regulated as a function of a melt bath length or melt bath area detected and wherein at least one of a gap offset and a weld position of the laser beam is regulated as a function of the detected geometry of the melt bath.

2. The apparatus of claim 1, wherein recognition of melt bath ejections takes place via detection of the melt bath length.

3. The apparatus of claim 1, wherein the camera records electromagnetic radiation in a range between 800 nm and 1,100 nm.

4. The apparatus of claim 3, wherein the camera detects electromagnetic radiation in a range between 820 nm and 1,050 nm.

5. The apparatus of claim 4, wherein a sharp-edged interference filter as well as a gray filter of optical density are placed ahead of the camera.

6. The apparatus of claim 1, wherein gray value assignment of the pixels of a melt bath image detected by the camera is effected by the image data processing unit.

7. The apparatus of claim 6, wherein a three-stage gray value assignment including white, gray and black is effected by the image data processing unit.

8. The apparatus of claim 2, wherein the camera records electromagnetic radiation in a range between 800 nm and 1,100 nm.

9. The apparatus of claim 8, wherein the camera detects electromagnetic radiation in a range between 820 nm and 1,050 nm.

10. The apparatus of claim 9, wherein a sharp-edged interference filter as well as a gray filter of optical density are placed ahead of the camera.

11. The apparatus of claim 2, wherein gray value assignment of the pixels of the melt bath image detected by the camera is effected by the image data processing unit.

12. The apparatus of claim 4, wherein gray value assignment of the pixels of a melt bath image detected by the camera is effected by the image data processing unit.

13. The apparatus of claim 12, wherein a three-stage gray value assignment including white, gray and black is effected by the image data processing unit.

14. An apparatus for regulating welding parameters during laser beam welding, comprising:
   a CCD camera for detecting a geometry of a melt bath formed during a welding process, and
   an image data processing unit,
      wherein the camera is operably connected with the image-data-processing unit such that a focus position of the laser beam is regulated as a function of a geometric similarity factor, which is calculated as the quotient of the melt bath area and the distance between the geometric centers of gravity of a laser beam keyhole and the melt bath area.

15. The apparatus according to claim 14, wherein the camera records electromagnetic radiation in a range between 800 nm and 1,100 nm.

16. The apparatus according to claim 15, wherein the camera detects electromagnetic radiation in a range between 820 nm and 1,050 nm.

17. The apparatus according to claim 14, wherein a sharp-edged interference filter as well as a gray filter of optical density are placed ahead of the camera.

18. The apparatus according to claim 16, wherein a sharp-edged interference filter as well as a gray filter of optical density are placed ahead of the camera.

19. The apparatus according to claim 14, wherein gray value assignment of the pixels of a melt bath image detected by the camera is effected by the image data processing unit.

20. The apparatus according to claim 19, wherein a three-stage gray value assignment including white, gray and black is effected by the image data processing unit.

21. A method of manufacturing a structure by laser beam welding parts together, comprising:
   projecting a laser beam onto the parts to weld them with formation of a melt bath having a melt bath geometry including a melt bath length, a melt bath area, and a melt bath depth,
   detecting the melt bath geometry utilizing a CCD camera and supplying a melt bath geometry signal from the camera to an image processing unit,
   and controlling the projection of the laser beam to control the melt bath depth as a function of at least one of the melt bath length and the melt bath area wherein at least one of a gap offset and a weld position of the laser beam is regulated as a function of the detected geometry of the melt bath.

22. A method according to claim 21, wherein the control of the melt bath depth is made as a function of the melt bath length.

23. A method according to claim 21, wherein the camera records electromagnetic radiation in a range between 800 nm and 1,100 nm.

24. A method according to claim 21, wherein gray value assignment of the pixels of a melt bath image detected by the camera is effected by the image data processing unit.

25. A method according to claim 24, wherein a three-stage gray value assignment including white, gray and black is effected by the image processing unit.

26. A method of manufacturing a structure by laser beam welding parts together, comprising:
   projecting a laser beam onto the parts to weld them with formation of a melt bath having a melt bath geometry including a melt bath length, a melt bath area, and a melt bath depth,
   detecting the melt bath geometry utilizing a CCD camera and supplying a melt bath geometry signal from the camera to an image processing unit,
   and controlling the projection of the laser beam such that a focus position of the laser beam is regulated as a function of a geometric similarity factor calculated as a quotient of the melt bath area and the distance between the geometric centers of gravity of a laser beam keyhole and the melt bath area.

27. A method according to claim 26, wherein the camera records electromagnetic radiation in a range between 800 nm and 1,100 nm.

* * * * *